United States Patent [19]

Tamura et al.

[11] 4,219,424

[45] Aug. 26, 1980

[54] APPARATUS FOR ENRICHING OXYGEN CONTAINED IN WATER

[75] Inventors: Takaaki Tamura; Tomeyoshi Ozawa; Wataru Ito; Norihiko Fujita; Naoki Negishi, all of Tokyo, Japan

[73] Assignee: Industrial Research Institute, Tokyo, Japan

[21] Appl. No.: 941,667

[22] Filed: Sep. 12, 1978

Related U.S. Application Data

[63] Continuation of Ser. No. 775,479, Mar. 8, 1977, abandoned.

[30] Foreign Application Priority Data

| Jun. 18, 1976 [JP] | Japan | 51-72041 |
| Aug. 13, 1976 [JP] | Japan | 51-96784 |
| Dec. 29, 1976 [JP] | Japan | 51-160678 |

[51] Int. Cl.$^2$ ............................ C02B 1/34; C02C 5/04
[52] U.S. Cl. .................................. 210/201; 210/218; 210/255
[58] Field of Search ............... 210/15, 63 R, 255, 194, 210/195.1, 200, 201, 209, 220, 221 R, 221 M, 221 P, 218; 261/121 R, 126, DIG. 5, DIG. 70

[56] References Cited

U.S. PATENT DOCUMENTS

| 3,054,602 | 9/1962 | Proudman | 210/201 X |
| 3,547,815 | 12/1970 | McWhirter | 210/15 |
| 3,826,742 | 7/1974 | Kirk et al. | 210/63 R |
| 3,945,918 | 3/1976 | Kirk | 210/255 |
| 3,968,035 | 7/1976 | Howe | 210/63 R |
| 4,136,023 | 1/1979 | Kirk et al. | 210/218 X |

Primary Examiner—Thomas G. Wyse
Attorney, Agent, or Firm—Sherman & Shalloway

[57] ABSTRACT

An apparatus for enriching dissolved oxygen in water which comprises a plurality of dissolving devices, each of which comprises: (a) a pair of vertically arranged tubular bodies, the lower end of the first tubular body being provided with an inlet through which raw water is introduced and the lower end of the second tubular body being provided with an outlet for discharging oxygen enriched water; (b) a tube connecting the interior of both tubular bodies at the central portions thereof; (c) a bubbler disposed in the interior of the first tubular body for flowing an oxygen enriched gas into the raw water and for moving the raw water into the second tubular body through the connecting tube; (d) a pipe for connecting the top portions of the tubular bodies which form a chamber for the gas above the liquid level of the raw water in each of the tubular bodies; (e) a means for supplying an oxygen enriched gas into the chamber in the second tubular body; and (f) a means for supplying the gas in the chambers to the bubbler.

3 Claims, 10 Drawing Figures

APPARATUS FOR ENRICHING OXYGEN CONTAINED IN WATER

This is a continuation of application Ser. No. 775,479, filed Mar. 8, 1977, now abandoned.

BACKGROUND OF THE INVENTION

This invention relates to a method of producing an oxygen enriched water which is used for the purpose of accelerating activation of aerobe and an apparatus suitable for carrying out the same.

In addition, this invention relates to a method of utilizing the oxygen enriched water obtained by the above mentioned method so as to purify sewage and an apparatus for carrying out the same.

DESCRIPTION OF THE PRIOR ART

The technique of dissolving oxygen into water is extremely effective for the purpose of accelerating activation of aerobe, for example, and improving the effect of purifying sewage. In general, such technique makes use of aeration. However, usual aeration has the following technical and economical limitations.

(1) The solubility of oxygen in water is about two times larger than that of nitrogen. In the case of using air, an average ratio of partial pressure of oxygen to partial pressure of nitrogen is 0.21:0.79. As a result, let balance due to Henry's law be maintained, an amount of nitrogen which is about two times larger than that of oxygen is dissolved into water. In prctice, therefore, what is intended for enriching oxygen results in acceleration of enriching nitrogen.

(2) The solubility of oxygen in water has an absolute value which is very small, on the order of about 9 mg/1H$_2$O under a balanced condition with air at 20° C.

(3) An aeration method which makes use of an oxygen gas obtained from an oxygen bomb or liquid oxygen is expensive with respect to an oxygen gas source. In addition, oxygen obtained by a conventional method has a solubility of 5 to 6% only, the remainder of oxygen gas being uselessly delivered into atmospheric air, which is very defective from an economical standpoint of view.

SUMMARY OF THE INVENTION

An object of the invention, therefore, is to provide a method and apparatus which can obtain a much amount of oxygen enriched water in a relatively simple and economical manner.

Another object of the invention is to provide a method of purifying sewage which can effectively purify sewage without being influenced by the carbon dioxide produced from biochemical oxidation and an apparatus suitable for carrying out the method.

A further object of the invention is to provide an improved apparatus for purifying sewage which can effect an efficient purification with the aid of a single treating tank.

DETAILED DESCRIPTION OF THE INVENTION

Figure 1:
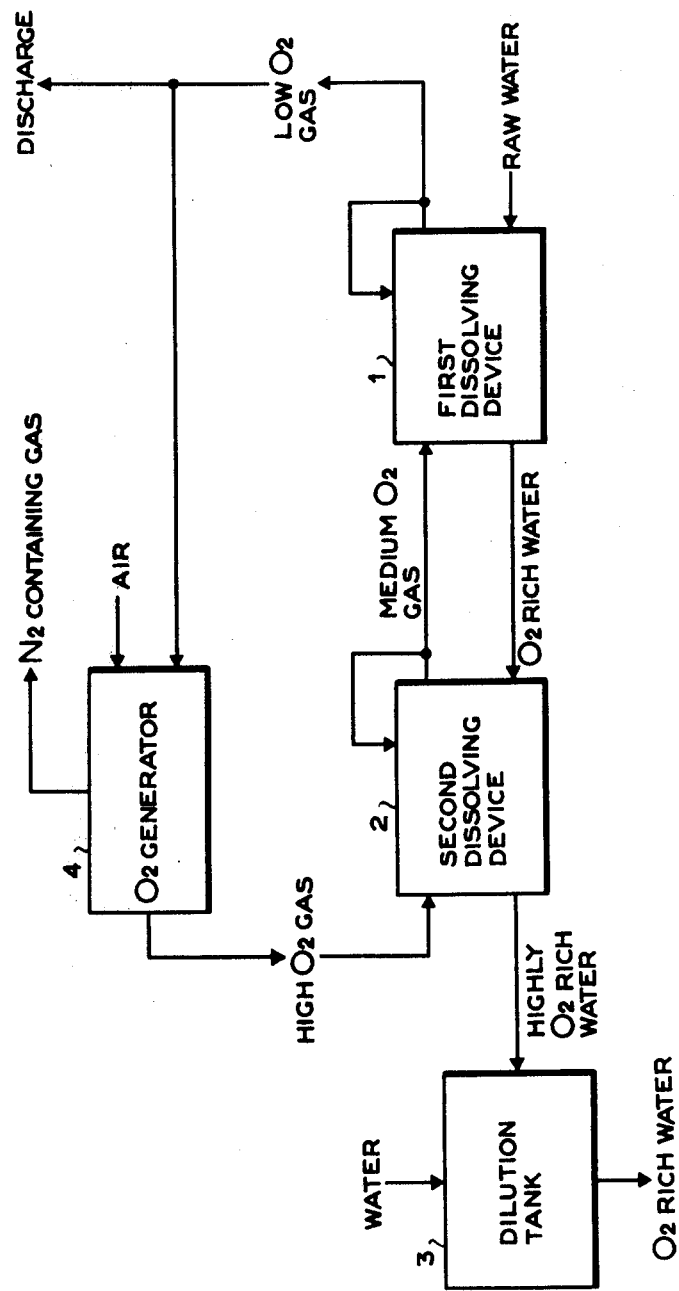
FIG. 1 is a flow chart for illustrating successive steps of dissolving oxygen into liquid in the method according to the invention.

One embodiment of the invention will now be described with reference to the accompanying drawings. Referring to FIG. 1, raw water to be treated is passed through a first dissolution device 1 and second dissolution device 2 and becomes enriched with oxygen to obtain an oxygen enriched water containing oxygen dissolved therein and having a very high concentration. The oxygen enriched water thus obtained is diluted in a dilution device 3 with the raw water or ordinary water until the oxygen concentration of the diluted water reaches a desired value. Then, a large amount of oxygen enriched water is taken out of the dilution device 3. The dilution in the dilution device 3 is required for the purpose of preventing the oxygen remaining in the water from being delivered when the oxygen enriched water makes contact with atmospheric air. As a result, it is possible to obtain a much amount of oxygen enriched water.

Into the second dissolution device 2 is introduced a highly concentrated oxygen obtained from an oxygen generator 4. The highly concentrated oxygen circulates through the second dissolution device 2 and makes contact with the oxygen enriched water which has been treated by the first dissolution device 1. While the oxygen enriched water is delivered from the second dissolution device 2 to the dilution device 3, an intermediate concentration oxygen gas whose oxygen concentration becomes lowered in contact with water is fed back from the second dissolution device 2 to the first dissolution device 1. The intermediate concentration oxygen gas circulates in the first dissolution device 1 to enrich raw water with oxygen. A low concentration oxygen gas whose oxygen concentration becomes lowered in contact with raw water in the first dissolution device 1 is delivered into atmospheric air or fed back into the oxygen generator 4, if necessary.

The oxygen generator 4 functions to generate a highly concentrated gas containing oxygen having a concentration which is higher than an average oxygen concentration in air of about 21%. The oxygen generator 4 may be of conventional construction.

Let a rate of percent of effective oxygen content $V_E$ be defined by $$V_E = \frac{\text{Oxygen concentration} - 21}{79},$$

then $V_E = 0$ when gas is air and $V_E = 1$ when gas is pure oxygen. The invention makes it possible to effectively utilize an oxygen gas having such oxygen concentration within a range of from $V_E = 0$ to $V_E = 1$. If economical condition permits, pure oxygen gas obtained from an oxygen bomb or from liquid oxygen may also be used.

That is, in accordance with the invention, raw water passes through the first dissolution device 1 and second dissolution device 2 in the order mentioned above, but an oxygen containing gas which makes contact with the raw water passes through the second dissolution device 2 and first dissolution device 1 in the order opposed to that of the raw water. In this way, in the first dissolution device 1, the raw water makes contact with the oxygen containing gas having a relatively low oxygen concentration and is enriched with oxygen.

Figure 2:
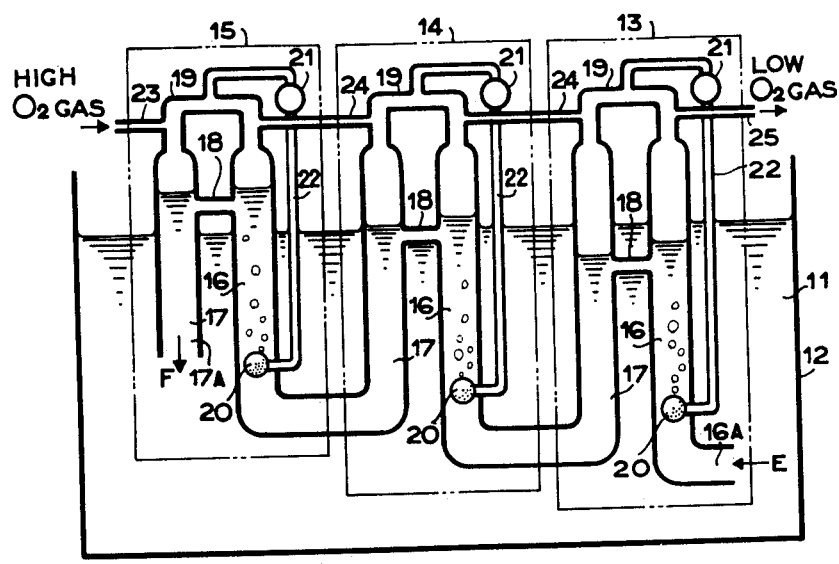
FIG. 2 is a schematic cross sectional view of an apparatus for enriching oxygen in accordance with the method shown in FIG. 1.

In FIG. 2 is shown one embodiment of apparatus for carrying out the process shown in FIG. 1. The apparatus is constructed such that liquid, for example, water 12 to be treated is enclosed in an aeration tank 11 and comprises 3 stages of dissolution devices 13, 14 and 15. The first dissolution device 13 is provided therein with a pair of tubular bodies 16 and 17 which are substantially vertically arranged. The tubular bodies are connected to each other through a communication pipe 18 at their center portions and through a connection pipe 19 at their top portions. The tubular body 16 is provided at its lower end with an inlet 16A which is opened in the aeration tank 11 below the surface of water to be treated 12. The lower end of the tubular body 17 is connected to the lower end of the tubular body 16 of the second dissolution device 14. In addition, the tubular body 16 is provided at its lower end with a spherical bubbler 20 formed of porous porcelain into which is supplied under pressure an oxygen containing gas delivered from the inside of the connection pipe 19 through a pipe 22 by means of a pump 21. In the second and third dissolution devices 14 and 15, the lower end of the tubular body 16 is connected to the lower end of the tubular body 17 of the preceeding dissolution device 13 or 14. The third dissolution device 15 is provided at the lower end of the tubular body 17 thereof with an outlet 17A which is opened in the aeration tank 11 such that the oxygen containing gas is diluted without touching with air. Except these points, the second and third dissolution device 14 and 15 are the same in construction as the first dissolution device 13, so that corresponding parts of all of these dissolution devices are shown by the same reference numerals and the description of the second and third dissolution devices are omitted.

Water supplied into the inlet 16A at the lower end of the tubular body 16 of the first dissolution device 13 in a direction shown by the arrow E rises in the tubular body 16 by an air lift action due to air bubbles produced from the bubbler 20 and passes through the communication pipe 18 and enters into the tubular body 17. Then, the water enters into the tubular body 16 of the second dissolution device 14 by the same air lift action and rises in the tubular body 16. The water passes through each of the dissolution devices 13, 14 and 15 in the order as mentioned thus producing an oxygen enriched water. The oxygen enriched water is fed back from the outlet 17A at the lower end of the tubular body 17 of the third dissolution device 15 in a direction shown by the arrow F into the aeration tank 11 in which the oxygen enriched water becomes diluted and functions to accelerate the activation of aerobe.

An oxygen containing gas supplied from the oxygen generator (not shown) is introduced through a pipe 23 into the connection pipe 19 of the third dissolution device 15 and then delivered from the bubbler 20 into the water. The oxygen containing gas thus contacted with water is supplied through the pipe 24 into the connection pipe 19 of the second dissolution device 14. This oxygen containing gas flows through the second and first dissolution devices 14 and 13 in the same passages and finally is delivered from the connection pipe 19 of the first dissolution device 13 through a pipe 25 to the outside. In the apparatus constructed as above described, the water to be treated passes through the first, second and third dissolution devices 13, 14 and 15 in succession and makes contact with the oxygen containing gas whose oxygen concentration becomes successively high to increase its oxygen concentration and then is diluted with the water to be treated. In addition, the apparatus does not require a large power input for the purpose of agitating the gas and liquid which has been required in the conventional aeration tank and hence is more economical than the conventional apparatus. As can be seen from the above, the oxygen enriching action with a high oxygen solubility may be effected in a highly efficient manner.

The number of stages for effecting gas-liquid contact in respective dissolution devices is a factor for determining solubility of oxygen with respect to the liquid to be treated, that is, for determining a rate of percent of the oxygen content to be utilized. The more the number of these stages, the more the rate of percent of the oxygen content to be utilized is improved. In a small scale plant for treating a small amount of liquid, one stage of gas-liquid content is sometimes preferable.

Figure 3:
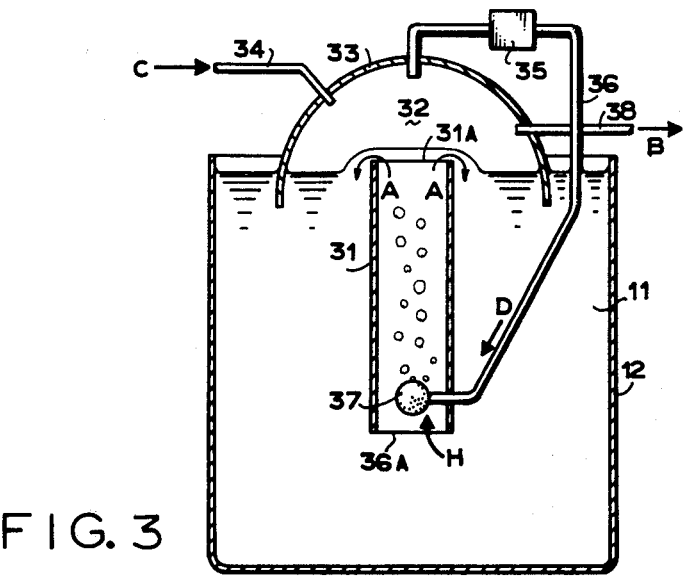
FIG. 3 is a schematic cross sectional view of a simplified apparatus for enriching oxygen according to the invention.

In FIG. 3 is shown an apparatus suitable for one stage of gas-liquid contact. In the present embodiment, in an aeration tank 11 enclosing water to be treated 12 therein is vertically arranged a single cylindrical body 31 with its upper end only projected beyond the water surface. A space above the cylindrical body 31 is closed by a dome-shaped cover 33 so as to form a gas liquid separation chamber 32.

Into the gas liquid separation chamber 32 is continuously supplied an oxygen containing gas containing, for example, 85 vol.% of oxygen at an amount of flow of 30 l/h from an oxygen gas supply pipe 34 extending through the cover 33. The oxygen containing gas is delivered through a pipe 36 and a bubbler 37 mounted in the lower end of the cylindrical body 31 into the latter at an amount of flow of, for example, 700 l/h by means of a pump 35. The water to be treated 12 in the cylindrical body 31 makes contact with the oxygen containing gas delivered from the bubbler 37 and is enriched with oxygen. The oxygen enriched water thus obtained rises in the cylindrical body 31 by the air lift action and overflow beyond outlet 31A at the upper end of the cylindrical body 36 in a direction shown by the arrow A, the water to be treated 12 being introduced through an inlet 36A into the cylindrical body 36 in a direction shown by the arrow H. Since the space above the cylindrical body 31 is closed by the cover 33, the oxygen enriched water does not make contact with air and is diluted with surrounding water to be treated 12. Gas not absorbed into the water to be treated 12 is separated from the surface of the water to be treated 12. The oxygen in the gas is dissolved in the water to be treated, so that the amount of oxygen content of the gas becomes decreased. Conversely, the amount of gases other than oxygen is increased by absorbing nitrogen or any other gases delivered from the water to be treated. As a result, a portion of the gas is taken out through an outlet pipe 38 to the outside in a direction shown by the arrow B. The remainder of the gas is mixed with the oxygen containing gas supplied from the pipe 34 in a direction shown by the arrow C and then is supplied through the pipe 36 into the bubbler 37 in a direction shwon by the arrow D. The amount of flow of the oxygen containing gas supplied from the pipe 34 is 30 l/h and the amount of flow of the gas supplied through the pipe 36 into the bubbler 37 is 700 l/h, so that the difference between these two amounts of flow is utilized again. As a result, a considerably large amount of the oxygen containing gas may be used with respect to the water to be treated in the cylindrical body 31, thereby effectively utilizing oxygen and attaining oxygen enriching effect in manner.

In the present invention, as the liquid to be enriched with oxygen, use may be made of substantially pure water or sewage which contains biochemically oxidizable substance (hereinafter will be called as "BOD"). However, it is considered that, in principle, organic substance contained in the sewage reacts in the following manner

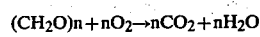

$$(CH_2O)n + nO_2 \rightarrow nCO_2 + nH_2O$$

to generate carbon dioxide which is equivalent in mol with oxygen consumed. As a result, the use of sewage results in the following disadvanges.

(1) If oxygen enriching treatment and sewage purification are simultaneously effected, oxygen is mixed with carbon dioxide gas produced and hence diluted, so the efficiency of utilizing oxygen becomes low.

(2) The solubility of carbon dioxide with respect to water is 30 times larger than that of oxygen at 25° C., so that oxygen enriching treatment becomes difficult under such a condition that a large amount of carbon dioxide is dissolved in water. As a result, sewage purification also becomes difficult.

In order to obviate such disadvantages, prior to a step of bringing a high concentration oxygen containing gas into contact with sewage, the sewage is contacted with air so as to drive out carbon dioxide contained in the sewage.

Figure 4:
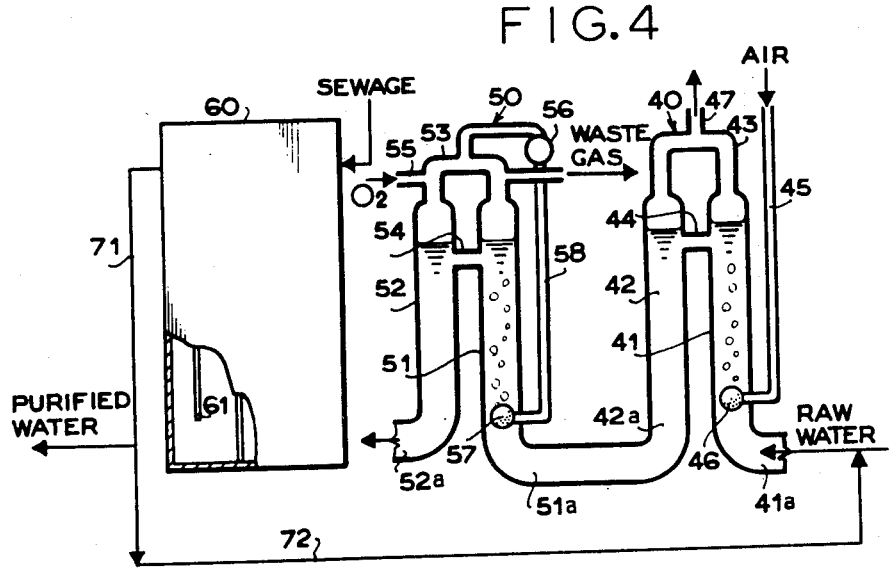
FIG. 4 is a schematic cross sectional view of an apparatus for purifying sewage according to the invention.

In FIG. 4 is shown an apparatus for carrying out the above treatment.

Raw water containing carbon dioxide generated when BOD is biochemically oxidized contains, for example, about 1,000 ppm of $CO_2$ and about 1 ppm of $N_2$. Oxygen is substantially absent. Such raw water is introduced into a carbon dioxide removing device 40. The device 40 is provided with a pair of tubular bodies 41 and 42 connected at their upper ends with each other and with a communication pipe 44 for communicating these tubular bodies 41 and 42 with each other. The raw water is introduced through an inlet 41a into the lower end of the tubular body 41. The raw water makes contact with an oxygen containing gas (usually air) supplied from a pipe 45 and delivered from a bubbler 46 and rises in the tubular body 41 by the air lift action. Then, the raw water flows through the communication pipe 44 into the second tubular body 42 and is delivered from an outlet 42a at the lower end of the tubular body 42 as water from which is removed $CO_2$ gas contained in the sewage. Air containing $CO_2$ gas removed from the raw water is discharged from a pipe 47. In the present embodiment, the water removed from $CO_2$ contains about 0.4 ppm of $CO_2$, about 10 ppm of $N_2$ and about 2 ppm of $O_2$. The $CO_2$ removed water is introduced into an oxygen enriching device 50. The oxygen enriching device 50 functions to dissolve an oxygen gas into the raw water such as the $CO_2$ removed water obtained from the carbon dioxide removing device 40. Oxygen enriched water thus obtained is supplied to a succeeding purifier tank 60. The oxygen enriching device 50 is provided with a pair of tubular bodies 51 and 52 arranged in parallel with each other and connected at their upper ends with each other through a connection pipe 53 and a communication pipe 54 for connecting center poritons of the tubular bodies 51 and 52 with each other. The first tubular body 51 is provided at its lower end with an inlet 51a for taking into the $CO_2$ removed water and the second tubular body 52 is provided at its lower end with an outlet 52a. The connection pipe 53 is provided with a pipe 55 for introducing a highly concentrated oxygen containing gas and with a pipe 58 for taking out the highly concentrated oxygen containing gas and delivering it through a bubbler 57 into the tubular body 51 by the action of a pump 56.

The bubbler 57 functions to make the gas delivered into the tubular body 51 contact with the raw water therein and at the same time to rise the raw water by the air lift action. As a result, the raw water causes the oxygen in the gas to be dissolved therein and hence is enriched with oxygen and then flows through the communication pipe 54 into the second tubular body 52. In the present embodiment, use is made of raw water which contains about 0.4 ppm of $CO_2$, about 10 ppm of $N_2$ and about 2 ppm of oxygen, that is, of $CO_2$ removed water. The oxygen enriched water thus obtained contains about 1 ppm of nitrogen and about 8 ppm of oxygen.

The oxygen enriched water delivered from the outlet 52a is supplied into the purifier tank 60 without making contact with air. In the purifier tank 60, the oxygen enriched water is mixed with sewage containing BOD under closed condition. The purifier tank 60 is provided with a number of deflecting plates 61 for the purpose of retaining the sewage and oxygen enriched water for a sufficiently long time therein. The sewage and the oxygen enriched water flow through the purifier tank 60 and make contact with each other to biochemically oxidize BOD by vigorous activation of aerobe, thereby consuming oxygen and generating carbon dioxide. The purified water taken out of the purifier tank 60 contains about 1,000 ppm of $CO_2$ and about 1 ppm of $N_2$. Oxygen is substantially absent therein. The purified water may be delivered through a pipe 71 to the outside or fed back through a pipe 72 to the inlet 41a of the carbon dioxide removing device 40 thus circulating the purified water until it is purified to a desired degree.

Instead of supplying the sewage into the purifier tank 60 so as to make it contact with the oxygen enriched water, the sewage may be supplied as raw water into the carbon dioxide removing device 40. Alternatively, the upper end of the purifier tank 60 may be opened. In this case, the oxygen enriching action becomes slightly degraded, but a desired purification may also be attained.

In the embodiment shown in FIGS. 1 and 2, the three dissolution devices 1, 2 and 3; 13, 14 and 15 are connected in cascade with one another and so constructed that the raw water passes through respective dissolution devices 13, 14 and 15 in the order as mentioned. Alternatively, the lower ends of the tubular bodies 16 and 17 of each of the dissolution devices 13, 14 and 15 may be made open. Such embodiment may preferably be applied in the case of treating sewage such that the sewage is slowly enriched with oxygen.

Figure 5:
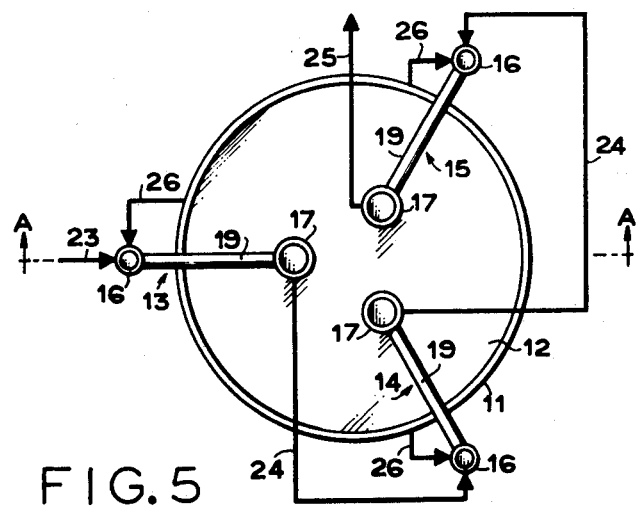
FIG. 5 is a schematic transverse sectional view of a modified apparatus for purifying sewage according to the invention.
Figure 6:
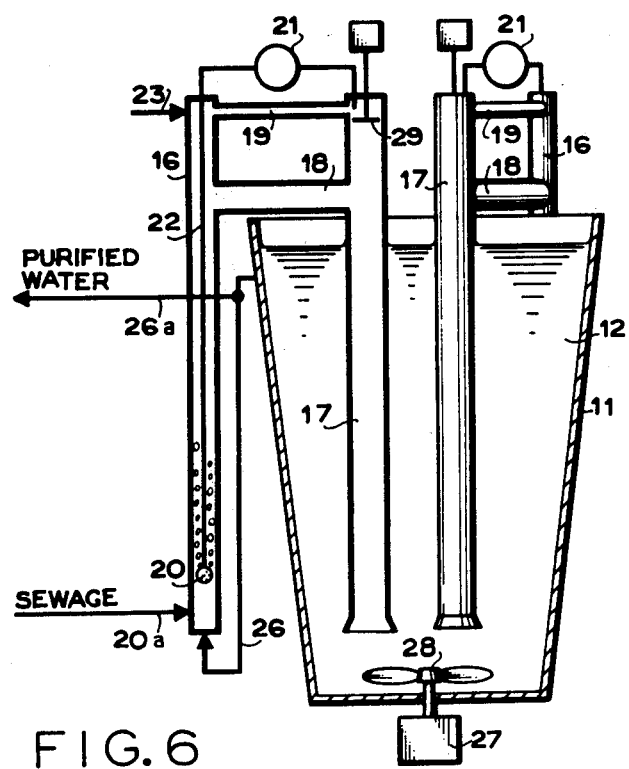
FIG. 6 is a section taken along a line A—A of FIG. 5.
Figure 7:
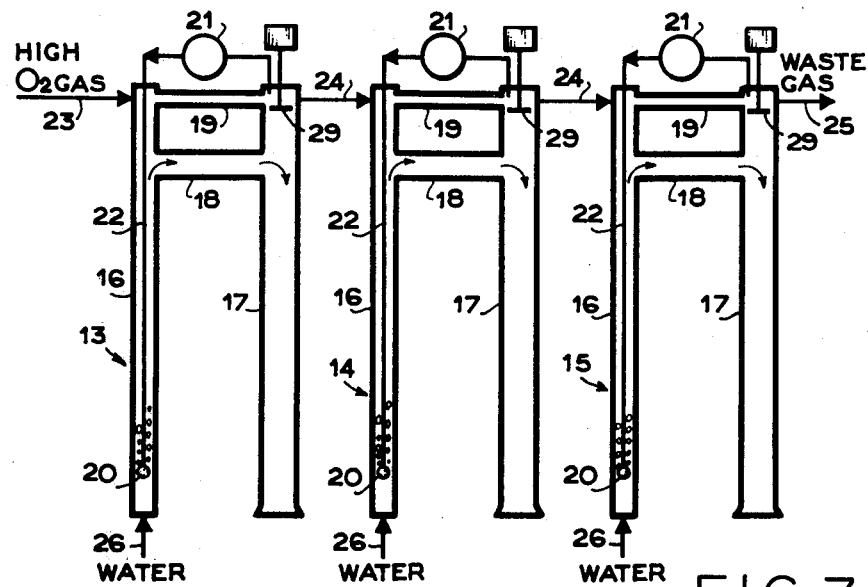
FIG. 7 is a front elevational view showing three dissolution tanks for the apparatus shown in FIGS. 5 and 6, these three dissolution tanks being arranged on one developed plane.

In FIGS. 5 and 6 is shown an apparatus constructed as above described. In FIG. 7 are shown respective dessolution devices 13, 14 and 15 as developed on one plane. In FIGS. 5 to 7, parts corresponding to those shown in FIG. 2 are designated by the same reference numerals and detailed description thereof is omitted. A portion of the liquid 12 enclosed in the tank 11 is introduced through a pipe 26 provided for each of the dissolution devices 13, 14 and 15 into the cylindrical body 16. The liquid 12 passes through the cylindrical body 16, communication pipe 18 and cylindrical body 17 and becomes enriched with oxygen and then is fed back from the lower end of the tubular body 17 into the tank 11. If the liquid 12 contains suspended solids or flocks, it is preferable to provide an impeller 28 adapted to be driven by a motor 27 so as to agitate the liquid 12. In addition, in order to positively effect gas-liquid separation at the upper end of the tubular body 17, it is desirous to provide a bubble elimination device 29 comprising, for example, a rotary disk.

Figure 8:
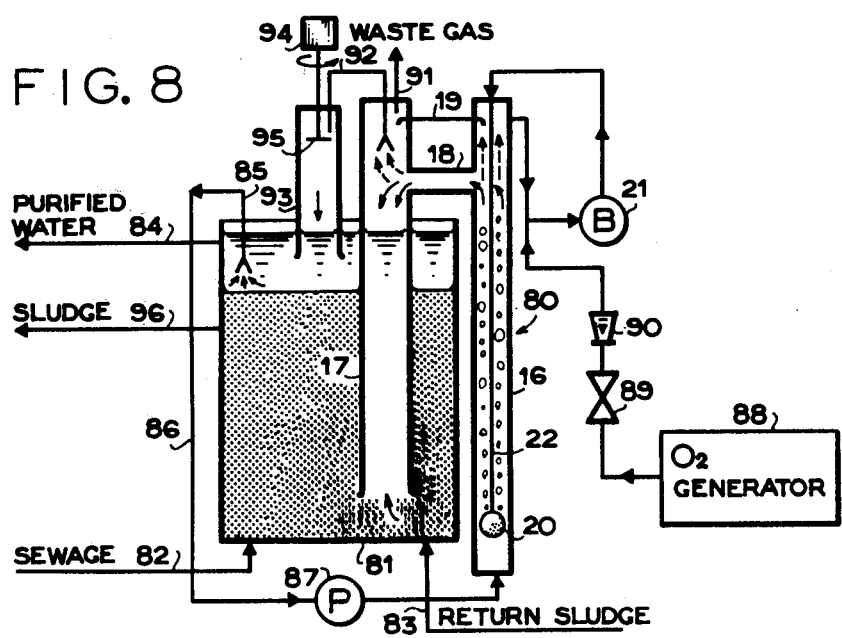
FIG. 8 is a schematic cross sectional view of an apparatus for treating sewage constructed on the basis of an active sludge method according to the invention.

In FIG. 8 is shown an apparatus so constructed as to treat the sewage on the basis of active sludge method. In the embodiment shown in FIG. 8, a tank 81 functions to accumulate therein sewage to be treated supplied from a pipe 82 and active sludge fed back through a pipe 83. Reference numeral 80 designates a dissolution device which comprises a separation tower 17. Oxygen enriched water flows from an opening at the lower end of the separation tower 17 into the tank 81. The sewage in the tank 81 is suitably agitated by the flow of the oxygen enriched water to cause solids to float on the sewage, thereby purifying it. In the upper portion of the tank 81 is present a transparent composition which forms a relatively clear portion of the sewage, so that a portion of the transparent composition may be overflown as clear water and delivered through a pipe 84 to the outside and the remainder may also be overflown and supplied through an upper pipe 85 and a pipe 86 to a mixing tower 16 of the dissolution tank 80 by means of a circulation pump 87. The construction and operation of the dissolution tank 80 are the same as those shown in FIG. 2, so that the corresponding parts shown in both FIGS. 2 and 8 are designated by the same reference numerals. Into a pipe 22 provided at its lower end with a bubbler 20 is fed under pressure a highly concentrated oxygen gas generated from an oxygen generator 88 through a valve 89, flow meter 90 and blower 21. Bubbles produced from the bubbler 20 cause the liquid in the mixing tower 16, that is, the above mentioned clear water or relatively clear liquid to rise by the air lift action. A gas-liquid mixture thus obtained is introduced through a pipe 18 into the separation tower 17 where the gas-liquid mixture is separated into liquid and gas. The liquid flows through the opening at the lower end of the separation tower 17 into the tank 81, while the gas is discharged through an opening at the upper end of the separation tower 17 and a pipe 91 to the outside. That gas-liquid mixture which is not separated from each other and takes a form of a group of bubbles is introduced through a collector pipe 92 into a bubble eliminating device 93. In the bubble eliminating device 93, the gas-liquid mixture is subjected to the action of a rotary disc 95 adapted to be driven by a motor 94 to eliminate bubbles and then fed back into the tank 81. A portion of gas in the separation tower 17 and gas generated in the mixing tower 16 is mixed with the highly concentrated oxygen and circulated through a pipe 19.

As described above, into a portion of the clear water or relatively clear portion in the upper part of the tank 81 is flown the highly concentrated oxygen gas to obtain a gas-liquid mixture and a large amount of oxygen is dissolved into the gas-liquid mixture, so that the concentration of oxygen dissolved and remaining in the mixture liquid in the tank 81 is increased. As a result, it is possible to vigorously activate the microbe existing in the mixture liquid and to effect biochemical purifying action in a highly efficient manner. A portion of the clear water, that is, the relatively clear portion, is delivered through a pipe 84 to the outside and a portion of the active sludge is supplied through a pipe 96 to a centrifugal separation device. An interphase between the relatively clear upper portion and the intermediate and lower sewage-active sludge mixture is determined by the balance existing among the amount of oxygen enriched water delivered from the separation tower 17, the amount of sewage flown into the tank 81 and the amount of sludge fed back into the tank 81, so that it is necessary to dispose the pipe 96 below the interphase thus determined. The intermediate mixed liquid is of substantially purified one, but, in order to improve efficiency, it is desirous to provide a multistage apparatus. In the aeration device shown in FIG. 8, a mixed liquid consisting of usual sewage and an active sludge liquid is not aerated by blowing directly an oxygen gas into the mixed gas, but a portion of a relatively clear liquid taken out is subjected to the air lift action by the subble pump to obtain an oxygen enriched water. The oxygen enriched water thus obtained is mixed with the mixed liquid so as to effect the biochemical action in a highly efficient manner. As a result, the tank 81 shown in FIG. 8 is not under usual aeration condition.

Figure 9:
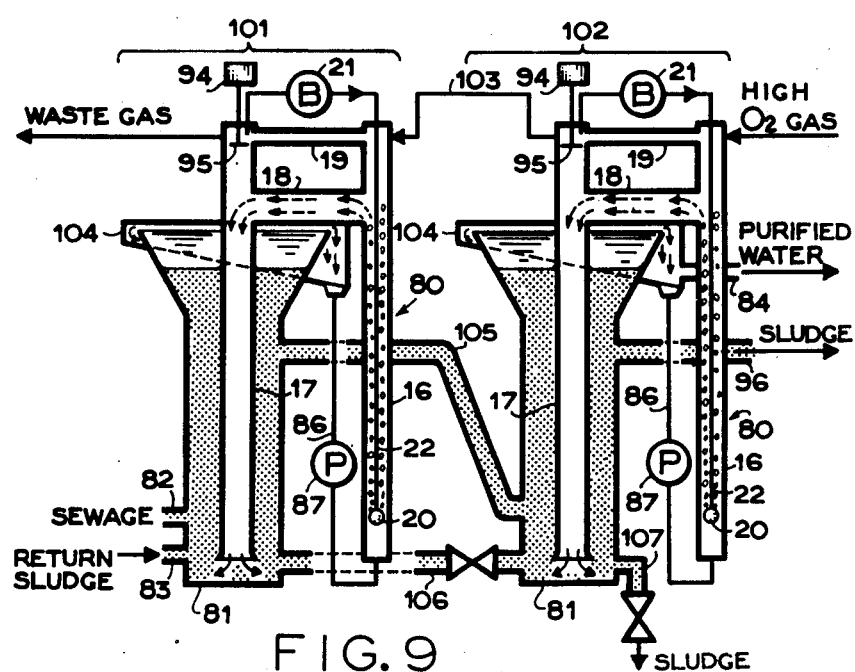
FIG. 9 is a schematic cross sectional view of a modified apparatus for purifying sewage which makes use of two aeration devices each shown in FIG. 8 and connected in cascade.

In FIG. 9 is shown another embodiment of the apparatus shown in FIG. 8. In the present embodiment, use is made of two aeration devices 101 and 102 connected in cascade. In FIGS. 8 and 9, the corresponding parts are designated by the same reference numerals and description thereof is omitted. These two aeration devices are substantially the same in construction. Sewage to be treated is supplied into a tank 81 of the preceeding aeration device 101 and a highly concentrated oxygen generated from the oxygen generator 88 is introduced into a mixing tower 16 of the succeeding aeration device 102 and rises therein by the air lift action and is dissolved into the sewage. The air lift action fuctions to significantly reduce the power for operating a circulation pump 87. The remainder of the highly concentrated oxygen is separated from the liquid in the separation tower 17 and then introduced through a pipe 103 into a mixing tower 16 of the preceeding aeration device 101. The upper clear composition, i.e., relatively clear porition is taken out through an overflow device 104 to the outside and then is supplied through a pipe 86 to the mixing tower 16. A portion of the active sludge and sewage is introduced through a transfer pipe 105 into the tank 81 of the succeeding aeration device 102.

In the present embodiment constructed as above described, the sewage previously treated in the preceeding aeration device 101 to certain extent is treated by the highly concentrated oxygen in the succeeding aeration device 102. As a result, the use of two aeration devices ensures a highliy efficient treatment for sewage. Alternatively, at least three stages may be connected in cascade.

In both the embodiments shown in FIGS. 8 and 9, the upper part of the tank 81 (in FIG. 9, the upper surface of the overflow device) is made open and not closed by the cover. That is, the dissolved oxygen does not escape from the upper part of the tank 81. The present embodiments can effectively utilize oxygen without using any cover for closing the upper part of the tank 81. In addition, it is preferable to arrange pipes terminated in the tank 81 at positions such that the most efficient treatment can be performed by taking into consideration the quality and amount of sewage, active sludge and the amount of circulating liquid. Pipes 106 and 107 are auxiliary pipes adapted to be used when the apparatus as a whole is repaired and closed under normal operation of the apparatus.

As stated hereinbefore, the sewage purifying apparatus according to the invention is capable of bringing a highly concentrated oxygen gas into contact with a portion of liquid to be treated which does not substantially contain any acid sludge and hence is relatively clear to obtain an oxygen enriched water, of simultaneously subjecting a circulating force due to the air lift action to the oxygen enriched water and of mixing the oxygen enriched water with sewage to be treated and active sludge, whereby biochemical aeration or purifying action as well as agitation due to the above mentioned circulating force can be effected in a highly efficient manner. As a result, the invention renders it possible to make the installation required for aeration significantly small in size.

Figure 10:
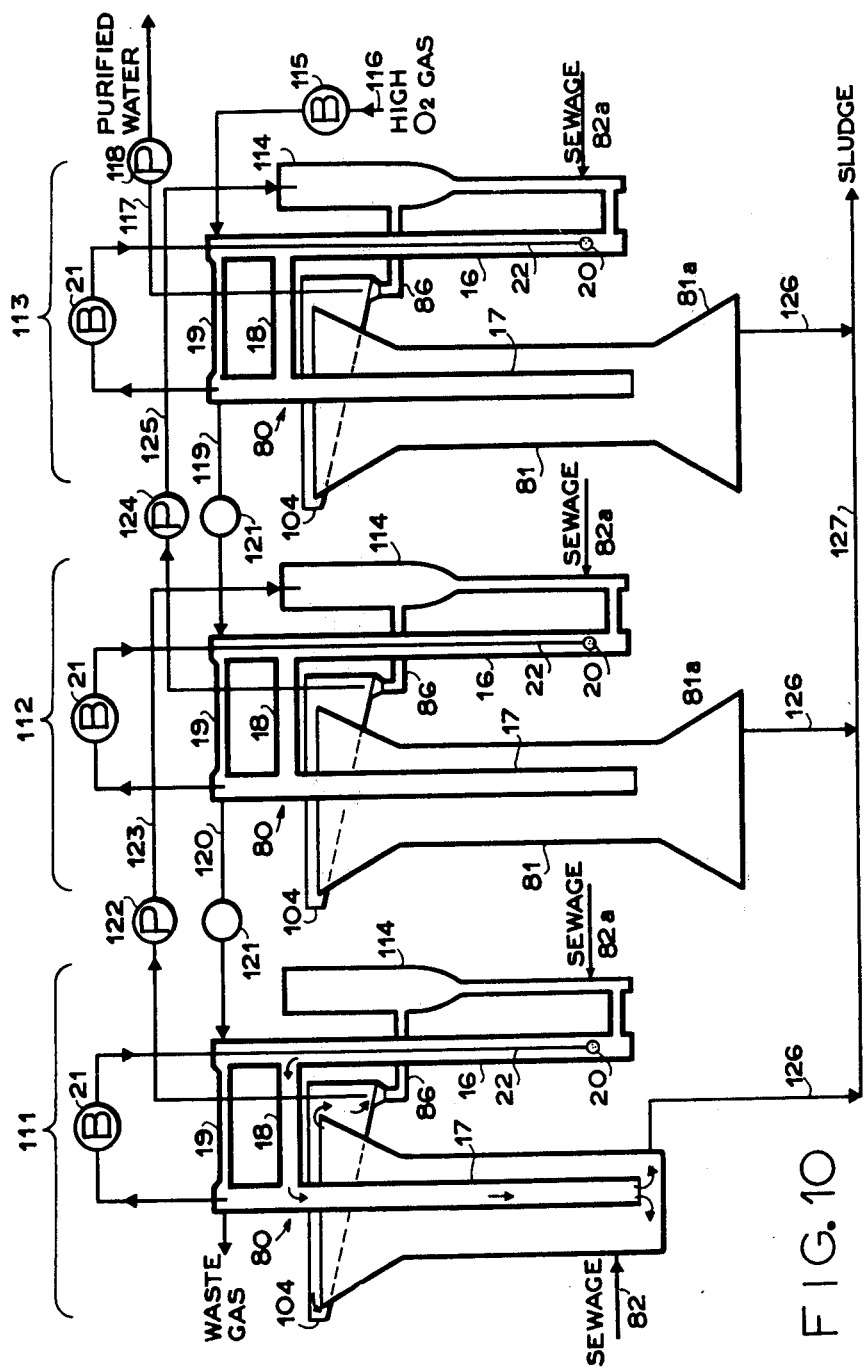
FIG. 10 is a schematic cross sectional view of an another modified apparatus for purifying sewage which makes use of three aeration devices each shown in FIG. 8 and connected in cascade.

In FIG. 10 is shown a further modified sewage purifying apparatus according to the invention. In the present embodiment, three aeration devices 111, 112 and 113 are connected in cascade. Each of these aeration devices is provided in its pipe 86 with an accumulation tank 114 for temporarily accumulating liquid delivered from the overflow device 104, and is not provided with the pump 87 shown in FIG. 9. Each of the aeration devices 112 and 113 is provided at the lower end of the tank 81 with a deposition portion 81a adapted to effectively deposit the sludge therein. The parts other than the above described points are substantially the same as those shown in FIG. 9.

In this embodiment, a highly concentrated oxygen gas is supplied from a pipe 116 through a blower 115 to a mixing tower 16 of the aeration device 113 and a portion of liquid in the overflow device 104 is taken out through a pipe 118 and a pump 117 to the outside as a purified liquid. The highly concentrated oxygen gas separated in the separation tower 17 is introduced through a pipe 119 into a dissolution device 80 of the preceeding second aeration device 112. The highly concentrated oxygen gas separated in the separation tower 17, the oxygen concentration being gradually decreased, is supplied through a pipe 120 to the dissolution device 80 of the first aeration device 111. Reference numeral 121 designates a gas densimeter for detecting the oxygen concentration of the gas passing through the pipes 119 and 120.

The supernatant composition obtained in the tank 81 of the first aeration device 111 is overflown beyond the tank 81 into the overflow device 104 from which is introduced through the pipe 86 into the accumulation tank 114. A portion of the supernatant composition is supplied through a pipe 123 and pump 122 into the accumulation tank 114 of the succeeding aeration device 112. In the same manner, a portion of the supernatant composition obtained in the aeration device 112 is introduced through a pipe 125 and pump 124 into the accumulation tank 114 of the succeeding aeration device 113. Finally, a portion of the supernatant composition is delivered as a purified liquid through a pipe 118 and pump 117 to the outside. In addition, in order to prevent solids floating on the surface of the supernatant liquid from being flown out, a wave-shaped plate may be disposed at a position which makes contact with the floating solids.

The active sludge deposited in each tank 81 is introduced from its base through a pipe 126 and a pipe 127 into a centrifugal separation machine (not shown). The amount of active sludge to be delivered from each tank 81 may be determined on the order that can compensate the amount of sludge flown into each tank 81 as a portion of the sewage or determined on the order that can compensate the amount of the acid sludge deposited in each tank 81. If necessary, the amount of active sludge to be delivered from each tank 81 may be made larger than the above mentioned amount and a portion thereof may be fed back into each tank 81. In the aeration device 111, the lower end opening of the separation tower 17 is located near the base of the tank 81, so that mixing is sufficiently effected without producing substantial precipitation. In the aeration devices 112 and 113, each tank 81 is provided at its base with a deposition portion 81a where a portion of the sludge is rapidly deposited. In this case, the sludge taken out of the pipe 126 becomes high in concentration, so that it is possible to reduce the total amount of the sludge to be separated by the centrifugal separation machine. Eventually, the centrifugal separation machine may be omitted.

The above described technique has been applied to the case in which a highly concentrated oxygen gas containing a large amount of oxygen gas than that contained in air in general is brought into contact with liquid so as to increase the amount of oxygen dissolved in the liquid and hence obtain an oxygen enriched liquid. This technique, however, may also be applied to the case in which the oxygen dissolved and remaining in the liquid is to be removed. The term "removal of oxygen dissolved and remaining" in liquid shall be understood to mean that a rate of percent of oxygen content is decreased to a given value on the basis of a ratio of oxygen content to nitrogen content in a liquid phase under a balanced condition that is produced when the liquid surface makes contact with air. Water at room temperature generally contains 15 ppm of nitrogen and 5 to 9 ppm of oxygen in respective dissolved state in water, so that a weight ratio of oxygen to nitrogen is 1:3 to 1:1. The invention can easily decrease a ratio in percent of oxygen content in water to a value equal to or smaller than 0.01 ppm.

In many fields which make use of water, oxygen dissolved and remaining in liquid has undesirable influence upon water, so that it is desired to obtain water including small rate in percent of oxygen content. For example, in the case of water for boilers, oxgyen dissolved and remaining in water functions to accelerate a corrosion failure of an inner wall surface of a boiler. Heretofore, it has been the common practice to remove oxygen from water by adding hydrazin, NaSO₃, etc. thereto and effecting a reduction treatment. In the case of liquid foods such as juice, milk, etc., in order to prevent acceleration of decay thereof due to oxygen dissolved and remaining therein, it is indispensable to remove oxygen by heating, effecting sterilization treatment at a low temperature, converting the liquid food into carbonate water, adding an antiseptic, and so forth. In the case of distillation products such as wine or grape wine etc., fermentaion can more or less remove oxygen, but its effect is very slight. As a result, it is necessary to add an antiseptic thereto. If use is made of water from which oxygen is sufficiently removed, the above mentioned foods can safely be preserved for a long time without adding any foreign substance.

In the case of removing oxygen dissolved and remaining in water by means of the apparatus shown in FIG. 2, for example, if a highly concentrated nitrogen gas is used instead of a highly concentrated oxygen gas and supplied into the pipe 23, it is possible to easily obtain the desired result. In such case, nitrogen is dissolved into liquid so as to expel the oxygen dissolved and remaining in the liquid. Any other treatments are effected in the same manner as in the case described above.

What is claimed is:

1. An apparatus for the enrichment of dissolved oxygen in water in a tank comprising a plurality of dissolving devices located in the tank, each of which consists essentially of:
    (a) a pair of vertically arranged tubular bodies, the first tubular body being provided at the lower end thereof with an inlet in the tank through which raw water is introduced and the second tubular body having at the lower end thereof an outlet in the tank for discharging oxygen enriched water;
    (b) communicating means above said inlet and outlet providing communication for said water between said first and second tubular bodies, said water being at a level above said communicating means in each of said tubular bodies;
    (c) a bubbler disposed in the lower interior end of said first tubular body for providing an oxygen enriched gas into the raw water and for causing the raw water to move into the interior of said second tubular body through said communicating means, said second tubular body providing gas-liquid separation means;
    (d) means for connecting the interior of said first and second tubular bodies at the top ends thereof which ends form a chamber for said gas above the liquid level of the raw water in each of said first and second tubular bodies;
    (e) means for supplying an oxygen enriched gas into said chamber in said second tubular body; and
    (f) means for supplying the gas in said chambers to said bubbler.

2. The apparatus as defined in claim 1 wherein each of the inlets is connected to the outlet of the preceding dissolving device so as to form a cascade connection through which the raw water and oxygen enriched gas are in countercurrent flow.

3. The apparatus of claim 1 wherein the communicating means between the first and second tubular bodies is at the central portion of the first and second tubular bodies.

* * * * *